A. SCHNEIDER.
LATHE GEARING.
APPLICATION FILED DEC. 8, 1916.
1,313,955.
Patented Aug. 26, 1919.
2 SHEETS—SHEET 1.
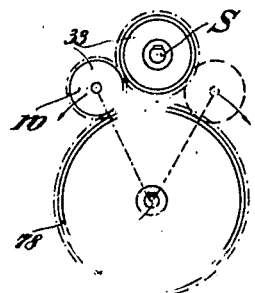
Fig. 2.
Fig. 1.
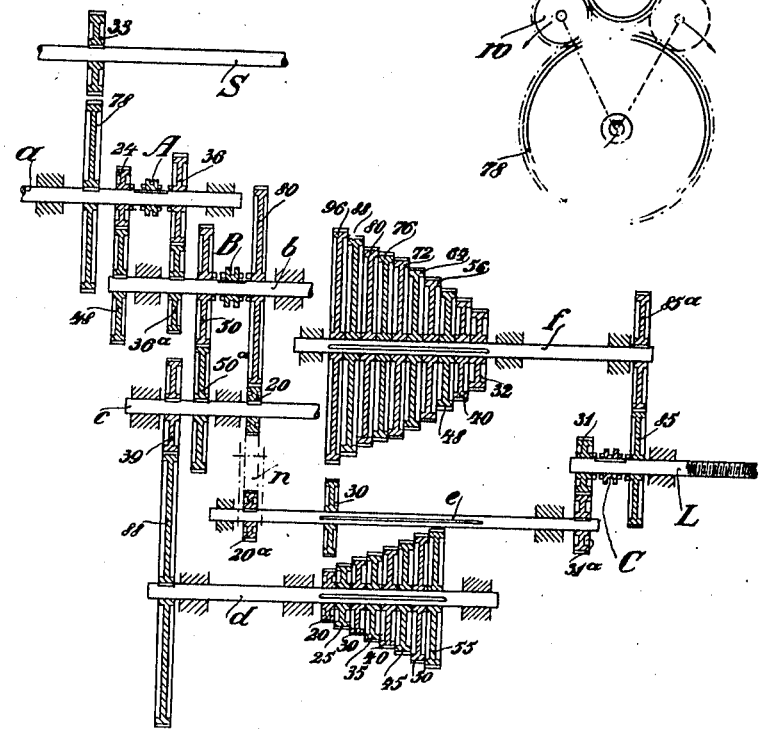
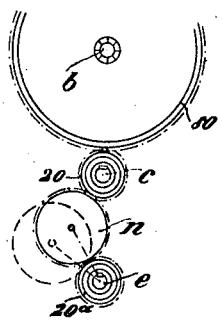
Fig. 3.
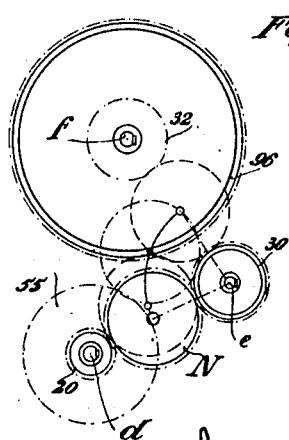
Fig. 4.
Inventor
Alvin Schneider
by [signature]
his Attorney

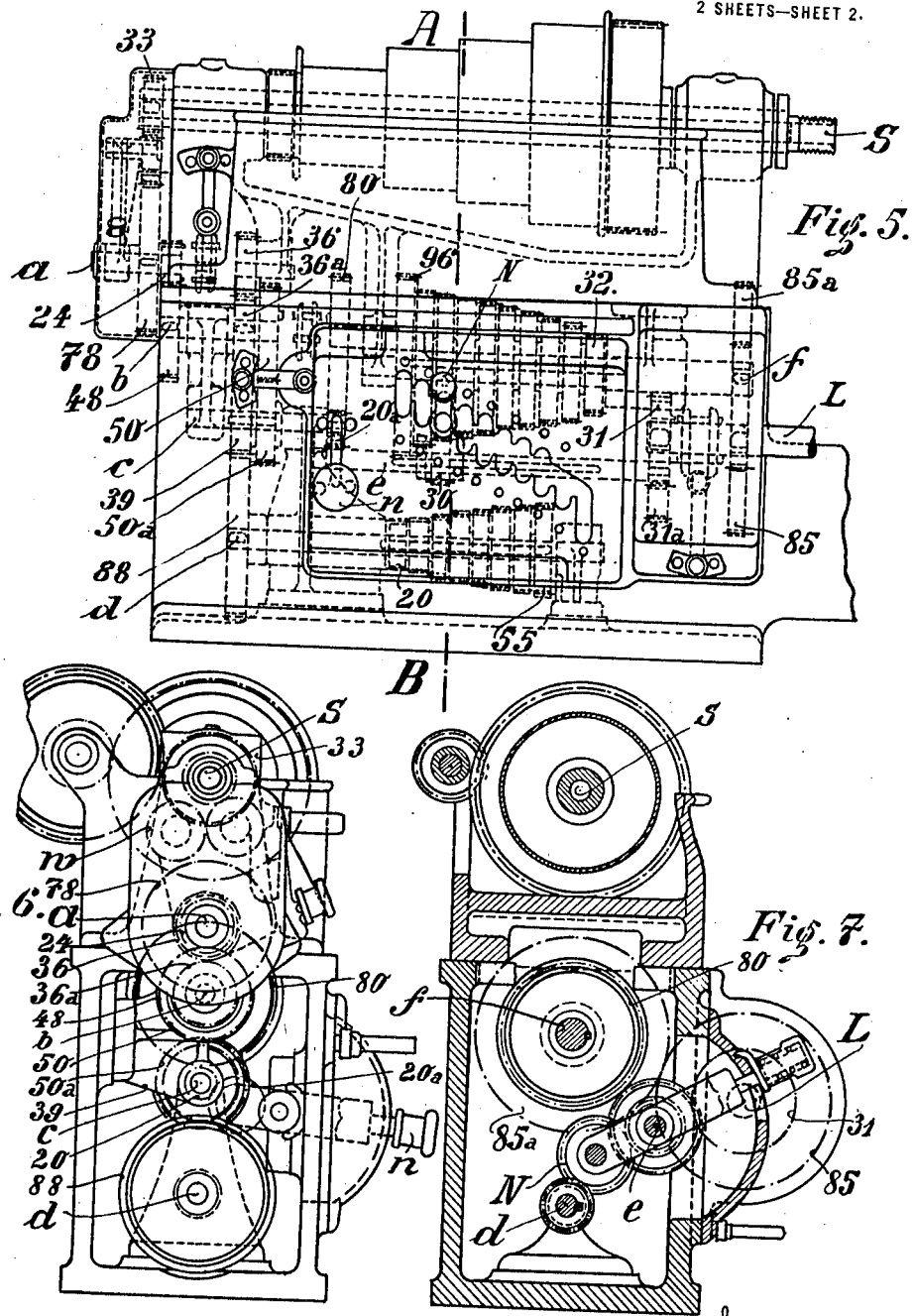

UNITED STATES PATENT OFFICE.

ALWIN SCHNEIDER, OF LENZBURG, SWITZERLAND.

LATHE-GEARING.

1,313,955.  Specification of Letters Patent.  Patented Aug. 26, 1919.

Application filed December 8, 1916. Serial No. 135,767.

*To all whom it may concern:*

Be it known that I, ALWIN SCHNEIDER, engineer, citizen of Switzerland, residing at Lenzburg, in the Canton Aargau, Switzerland, have invented certain new and useful Improvements in Lathe-Gearings, of which the following is a specification.

Fig. 1 is a front view showing some parts in section.

Figs. 2 to 4 are views of some details.

Fig. 5 is an elevational view of the gearing and of adjacent parts of the lathe.

Fig. 6 is an end elevation looking toward the right hand end of Fig. 5; and

Fig. 7 is a section on the line A—B of Fig. 5.

This invention relates to a new and useful improvement in gearings on lathes, enabling threads of various kinds to be cut without change gear wheels.

With this object in view the invention consists in the construction, arrangement, and combination of the several parts, all as will hereinafter be described, and afterward pointed out in the claim.

In the drawings some of the parts are shown in schematic design and the proportions in size are changed in order to make the drawings more comprehensible.

To the spindle S (partly shown only) of the lathe the gear wheel 33 is keyed and has 33 teeth. For simplicity and clearness sake all gear wheels are designated by numbers giving at the same time the number of teeth. Facing the gear wheel 33 there is on shaft $a$ the gear wheel 78 which can be connected by means of the reversing gear $w$ (Fig. 2, omitted in Fig. 1) to gear wheel 33 in such a way that the latter runs either ahead or astern. The shaft $a$ carries two loose gear wheels 24 and 36 which can be coupled with shaft $a$ by means of the flanged coupling A arranged between the two wheels. The gear wheel 24 is geared with gear wheel 48 and the gear wheel 36 with gear wheel $36^a$. The gear wheels 48 and $36^a$ are keyed to shaft $b$ which carries two loose gear wheels 50 and 80. The latter can be coupled with shaft $b$ by means of the flanged coupling B arranged between them. The gear wheel 80 is geared with gear wheel 20 and the gear wheel 50 with gear wheel $50^a$; the gear wheels 20 and $50^a$ are keyed to shaft $c$ which carries besides gear wheel 39 keyed to this shaft too and geared with gear wheel 88 on shaft $d$ to which a set of cone gears 20, 25, 30, 35, 40, 45, 50, 55 is keyed. The gear wheel 20 can be coupled with these by means of the Norton tumbler gear $n$ the swinging gear wheel of which is geared with gear wheel $20^a$, as shown in Fig. 3. In this figure the uncoupled position of the Norton tumbler gear is shown by the dotted lines. The gear wheel $20^a$ is keyed to shaft $e$ carrying the sliding gear wheel 30 which can be made to follow the shaft and is geared with the swinging gear of the second Norton tumbler gear N (Fig. 4, omitted in Fig. 1). By the latter the gear wheel 30 can be coupled with any wheel of the cone gear 20—55 or with any wheel of the second set of cone gears 96, 88, 80, 76, 72, 64, 56, 48, 40, 32. This second cone gear is keyed to shaft $f$ to which gear wheel $85^a$ is also keyed, which is geared with gear wheel 85 fitted loose to the lead screw L. Besides, the latter carries the loose gear wheel 31 geared with gear wheel $31^a$ which is keyed to shaft $e$. Between the gear wheels 31 and 85 the flanged coupling C is provided so as to be able to couple them with the lead screw L which is 8 mm. pitch, that means 3.175 threads per inch.

The gearing above described allows threads of various kinds to be cut by adjusting in different ways the three couplings A, B, C and the two Norton tumbler gears $n$ and N, eliminating thereby the removal and adjustment of change gear wheels. For the use of the gearing an index is made as shown by the example part of which follows hereafter.

| Whitworth. | | | | | Metric. | | | | | |
|---|---|---|---|---|---|---|---|---|---|---|
| Coupling. | | | Nor. tumb. g. | | Thr. p.1" | Coupling. | | | Nor. tumb. g. | | Pitch in mm. |
| A | B | C | $n$ | N | | A | B | C | $n$ | N | |
| 24 | 50 | 85 | 20 | 96 | 48 | 36 | 80 | 31 | disengaged. | 55 | 11 |
|  |  |  |  | •88 | 44 |  |  |  |  | 50 | 10 |
|  |  |  |  | 80 | 40 |  |  |  |  | 45 | 9 |

The figures mentioned in the first line of this index have the following meaning: If for instance, a screw with 48 threads per inch in Whitworth pitch is to be cut, then the coupling A must be adjusted to gear wheel 24, the coupling B to gear wheel 50 and the coupling C to gear wheel 85; the Norton tumbler gear $n$ must be connected to gear wheel 30, the Norton tumbler gear N to the gear wheel 60 of the upper set of cone gears. Thus the following equation is obtained:

$$\frac{33}{78}, \frac{24}{48}, \frac{50}{50^a}, \frac{20}{20^a}, \frac{30}{96}, \frac{85^a}{85} = \frac{3.175}{48}$$

In order to cut a screw in metric system of 11 mm. pitch, the coupling A must be geared with gear wheel 36, the coupling B with gear wheel 80 and the coupling C with gear wheel 31. The Norton tumbler gear $n$ must be disengaged and the Norton tumbler gear N connected to gear wheel 55 of the lower set of cone gears. Thus the following equation is obtained:

$$\frac{33}{78}, \frac{36}{36^a}, \frac{80}{20}, \frac{39}{88}, \frac{55}{30}, \frac{31^a}{31} = \frac{11}{8}$$

By changing the wheels this gearing enables 45 various standard threads in both systems to be cut, that is to say: 45 regular and 45 square threads from 0.5 to 48 per inch in Whitworth system and 45 regular and 45 square threads from 0.5 to 52 mm. pitch in metric system. To obtain this result, the wheels 24, 48 and 36, 36ª on shafts $a$ and $b$ are substituted by the following wheels: on shaft $a$ by three wheels with 60, 80 and 96 teeth which have to be coupled alternately with the shaft, on shaft $b$ by three wheels with 60, 40 and 24 teeth which are geared in corresponding succession with the former wheels. The wheels 50 and 80 on shaft $b$ are substituted by two wheels with 35 and 84 teeth and the wheels 50ª and 20 on shaft $c$ by two wheels with 70 and 21 teeth which are geared with the former wheels. The wheel 21 can be coupled with wheel 20ª on shaft $e$ by means of the Norton tumbler gear $n$. The set of cone gears on shaft $d$ is provided with two additional wheels with 60 and 65 teeth; in all other respects the gearing remains as it is. The various possibilities of gearing can be seen from special indexes. The metric cone gives also 45 feeds of 0.065 to 6.5 mm. per revolution for sliding and 45 feeds of 0.065 to 8.85 mm. per revolution for surfacing.

Worms with one or several threads can also be cut on this gearing.

Having thus described my invention, what I claim, and desire to secure by Letters Patent, is—

In lathe gearing, the combination of a driving shaft and a first intermediate shaft, means for imparting the rotary motion of the driving shaft to said first intermediate shaft, a pair of gear wheels mounted loosely on said first intermediate shaft, means for selectively coupling either of said gear wheels to its shaft, a second intermediate shaft adapted to be driven from said first intermediate shaft by means of the gear wheels thereon, a pair of gear wheels mounted loosely on said second intermediate shaft, means for selectively coupling either of said last mentioned gear wheels to its shaft, a third intermediate shaft adapted to be driven from said second intermediate shaft by the gear wheels on the latter, a fourth intermediate shaft and a series of graduated gear wheels mounted on the latter, gearing adapted to connect said third and fourth intermediate shafts to each other, a counter shaft and a lead screw, gearing adapted to connect said counter shaft to said lead screw, a Norton tumbler gear adapted to connect said third intermediate shaft to said counter shaft, a second counter shaft and a series of graduated gear wheels carried thereby, gearing adapted to connect said second counter shaft with said lead screw, and a second Norton tumbler gear adapted to connect said first counter shaft with said second counter shaft, whereby when said first mentioned Norton gear is in inoperative position said second mentioned Norton gear will connect the first counter shaft with the first gear on the fourth intermediate shaft.

In testimony whereof I have affixed my signature, in presence of two witnesses.

ALWIN SCHNEIDER.

Witnesses:
A. R. ABRINSKY,
CARL GUBLER.